(12) United States Patent
Dückinghaus

(10) Patent No.: US 6,397,593 B1
(45) Date of Patent: Jun. 4, 2002

(54) APPARATUS AND METHOD FOR IMPROVING THE EFFICIENCY OF A HYDRAULIC FLUID COOLER IN A SELF-PROPELLED AGRICULTURAL MACHINE

(75) Inventor: Heinrich Dückinghaus, Bielefeld (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/653,936

(22) Filed: Sep. 1, 2000

(30) Foreign Application Priority Data

Sep. 2, 1999 (DE) .......................... 199 41 841

(51) Int. Cl.[7] .............................................. F16D 31/02
(52) U.S. Cl. ...................................................... 60/456
(58) Field of Search ..................................... 60/456, 329

(56) References Cited

U.S. PATENT DOCUMENTS

| | | | | |
|---|---|---|---|---|
| 3,932,992 A | * | 1/1976 | Martin | 60/456 |
| 4,182,125 A | * | 1/1980 | Spivey | 60/431 |
| 4,218,885 A | * | 8/1980 | White | 60/456 |
| 5,890,509 A | * | 4/1999 | Becker et al. | 60/329 |
| 5,946,911 A | * | 9/1999 | Buschur et al. | 60/456 |

FOREIGN PATENT DOCUMENTS

DE         27 05 721 A1     9/1977

* cited by examiner

Primary Examiner—F. Daniel Lopez
Assistant Examiner—Igor Kershteyn
(74) Attorney, Agent, or Firm—Husch & Eppenberger, LLC; Robert E. Muir; H. Frederick Rusche

(57) ABSTRACT

An apparatus for improving the cooler efficiency of a hydraulic drive system in a self-propelled agricultural machine includes a constantly running hydraulic pump which is driven by an internal combustion engine and a diverting device. The hydraulic pump creates a constant circulating stream of hydraulic fluid that circulates separately from the working stream of hydraulic fluid of the system. The diverting device draws a partial stream of hydraulic fluid from the working stream to the cooler. The diverting device adjusts the size of the partial flow depending on the temperature of the constant circulating stream of fluid in order to allow the cooler to work continuously at optimum efficiency without exceeding the maximum permissible pressure in the system.

4 Claims, 2 Drawing Sheets

APPARATUS AND METHOD FOR IMPROVING THE EFFICIENCY OF A HYDRAULIC FLUID COOLER IN A SELF-PROPELLED AGRICULTURAL MACHINE

FIELD OF THE INVENTION

The present invention relates generally to agricultural machinery and, more particularly, to an apparatus and method for adjusting the amount of hydraulic fluid forced through a cooler in a hydraulic drive system to improve the efficiency of the cooler.

BACKGROUND OF THE INVENTION

Standard self-propelled agricultural machines incorporate an internal combustion engine and hydraulic drive systems including at least one hydraulic pump. The engine drives the hydraulic pump, which, in turn, supplies hydraulic fluid to hydraulic motors and/or hydraulic cylinders in the system. It is necessary to maintain the temperature of the hydraulic fluid within a recommended range. To accomplish this, a cooler is included in the hydraulic drive system.

In existing agricultural harvesting machines, a fixed amount of the total quantity of the circulating hydraulic fluid requiring cooling is fed through the cooler before it reaches the fluid tank where it is mixed with the fluid flowing directly back into the tank. The cooler and the quantity of fluid flowing therethrough have to be matched so that the maximum permissible fluid pressure in the fluid cooler will not be exceeded even at the start of work, i.e., when the fluid is cold and, as a consequence, the flow resistance in the pipes is high. Not only is this done to protect the cooler itself, but also to protect the shaft seals in the hydraulic motor and prevent the hydraulic pump from being damaged. However, because the quantity of fluid supplied to the cooler is fixed, the cooler will not be working efficiently when the fluid is hot and the resultant flow resistance in the pipes is lower.

SUMMARY OF THE INVENTION

It is an object of the present invention to overcome the deficiencies described above.

An object of the invention is to improve the working efficiency of the cooler by increasing the quantity of fluid subjected to the cooling process but without increasing the cooler's volumetric capacity or exceeding the permissible pressure in the system.

In accordance with one aspect of the invention there is provided a self-propelled agricultural machine incorporating an internal combustion engine and a hydraulic drive system including a hydraulic pump which is driven by the internal combustion engine and draws hydraulic fluid from a fluid tank to produce a working stream of hydraulic fluid which is returned to the fluid tank, a cooler, and an apparatus for improving the efficiency of the cooler which comprises conduit means for providing a separate circulating stream of hydraulic fluid circulating separately from the working stream of hydraulic fluid and fed back to the fluid tank via the cooler; and a diverting device installed in the separate circulating stream of fluid upstream of the cooler, said diverting device operative for drawing a variable quantity of fluid away from the working stream of fluid into the separate circulating stream of fluid depending on the temperature of the separate circulating stream of fluid.

In accordance with another aspect of the invention there is provided a method for improving the efficiency of a cooler in a hydraulic system of a self-propelled agricultural machine having an internal combustion engine which drives a hydraulic pump for drawing hydraulic fluid from a fluid tank and producing a working stream of hydraulic fluid which is returned to the fluid tank, the method comprising the steps of: producing a separate circulating stream of hydraulic fluid that circulates separately from the working stream of hydraulic fluid and flows from the fluid tank through the cooler, and back to the fluid tank; diverting a partial stream of hydraulic fluid from the working stream of hydraulic fluid to the cooler; and varying the flow of the diverted partial stream of hydraulic fluid The objects are achieved by creating a separate, advantageously constant, circulating stream of fluid, which circulates separately from the working fluid stream of the hydraulic drive system, to flow from the fluid tank and through a cooler prior to being fed back into the fluid tank and by installing a diverting device, such as a Venturi nozzle, in the constant circulating stream of fluid before the inlet thereof into the cooler, said diverting device drawing a partial stream of fluid away from the working fluid stream for the hydraulic drive system. The size of the partial stream diverted from the working stream depends directly on the temperature of the constant circulating stream of fluid.

The above and other objects, aspects, features and advantages of the present invention will become apparent from the following detailed description when taken in conjunction with accompanying drawings.

BRIEF DESCRIPTION OF THE DRAWINGS

Reference is now made to the drawing which illustrates the best presently known mode of carrying out the invention.

DETAILED DESCRIPTION

Figure 1:
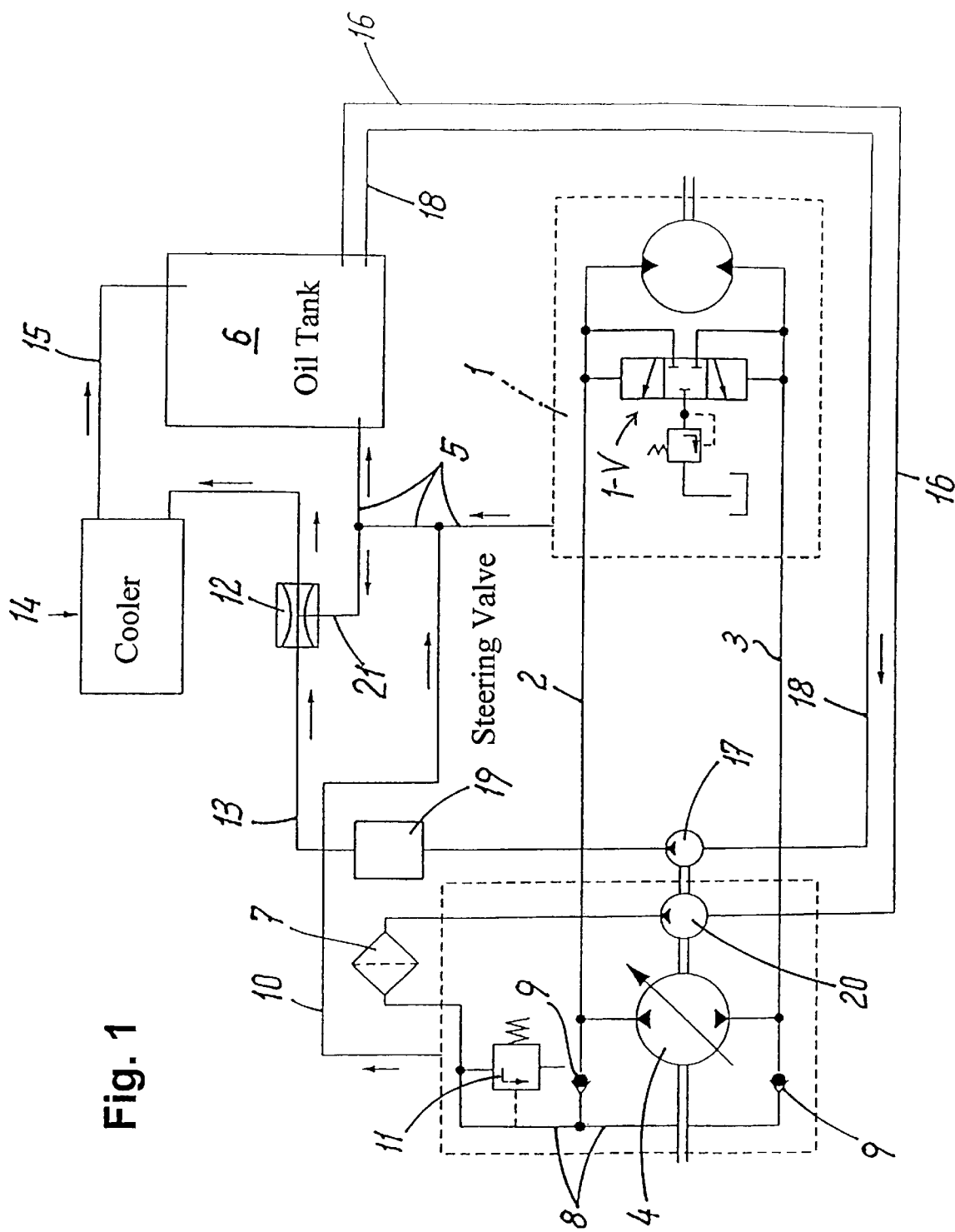
FIG. 1 is a diagrammatic view of a hydraulic system incorporating an embodiment of the present invention utilizing multiple pumps.

In FIG. 1, a hydraulic motor 1 for driving a harvesting machine is connected to a regulating fluid pump 4 via two pipes 2, 3. Depending on the setting of this pump 4, the hydraulic motor 1 will run at a faster or slower rate; and depending upon the setting of valves 1-V associated with the hydraulic motor 1, said motor will run forwards or backwards. The fluid returning from the hydraulic motor 1 reaches the fluid tank 6 through a tank pipe 5. A fluid pump 20 draws fluid from the fluid tank 6 through a pipe 16 and passes it through a filter 7 located in a pipe 8. The pipe 8 is connected via valves 9 to the regulating fluid pump 4. That quantity of fluid which is not extracted by the pump 4 passes through a return-flow pipe 10 to the tank pipe 5 and from there into the fluid tank 6. A pressure limiting valve 11 regulates the fluid pressure in the system in known manner.

As FIG. 1 illustrates, a separate fluid circuit is provided via an intake line or pipe 18, a fluid pump 17 which is conveniently constantly running, a feed line or pipe 13 which leads to a fluid cooler 14, and a return line or pipe 15. A pipe 21 is branched off from the tank pipe 5 and is connected to the suction end of a limiting device 12, preferably a Venturi nozzle. The limiting device 12 is inserted in the pipe 13 upstream of the fluid cooler 14. This creates a separate, advantageously constant, circulating stream of hydraulic fluid that circulates separately from the working fluid stream of the hydraulic system. A control valve 19, e.g., for the hydraulic steering system of a combine harvester, is inserted in the pipe 13 so that fluid will constantly flow therethrough and also through the following limiting device 12 thereby regulating the flow of fluid through the limiting device 12, preferably a Venturi nozzle. Depending on the temperature of the fluid, and thus its viscosity, flowing through the limiting device 12, a larger or smaller partial stream of the total quantity of fluid flowing through the tank pipe 5 will be drawn by the suction end of the limiting device 12 and fed to the fluid cooler 14.

Figure 2:
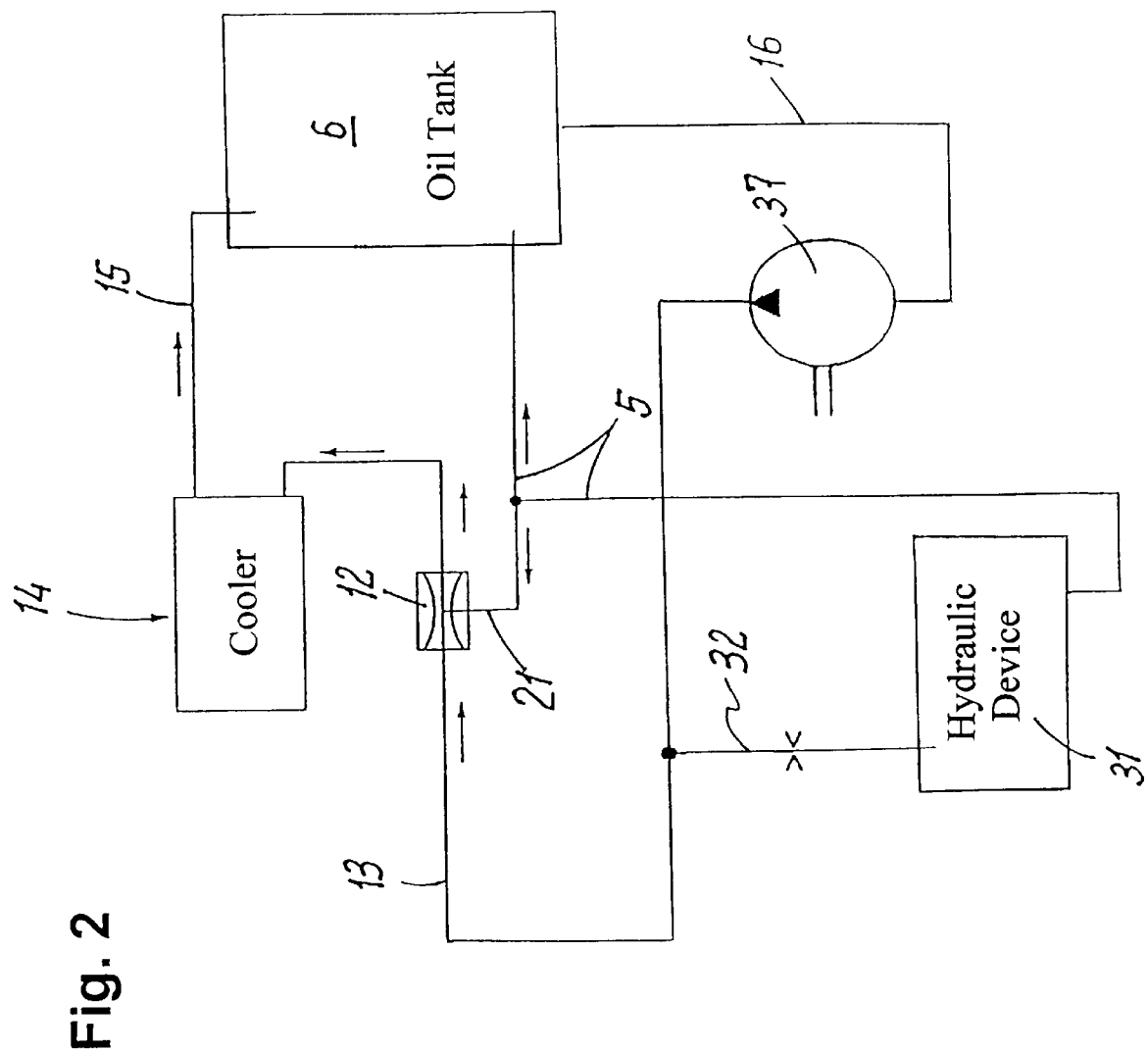
FIG. 2 is a diagrammatic view of a hydraulic system incorporating another embodiment utilizing one pump.

FIG. 2 shows a simplified system in which only one hydraulic pump 37 is utilized. Pump 37 is usually of higher capacity than pump 17 and may be of any convenient type, including a variable displacement type, depending upon the design requirements. Fluid flow from pump 37 goes to the fluid cooler 14 via pipe 13; and from there to the oil tank 6 via pipe 15. A branch pipe 32 leads from pipe 13 to a hydraulically operated device 31 such as a hydraulic motor, hydraulic ram, or the like. Fluid flow from the hydraulically operated device 31 returns to the oil tank 6 via tank pipe 5. As in FIG. 1, the Venturi nozzle 12 is inserted in the pipe 13 upstream of the fluid cooler 14, and pipe 21 is branched off from the tank pipe 5 and is connected to the suction end of the Venturi nozzle 12.

In both FIGS. 1 & 2, fluid flow in the pipe 13 and through the Venturi nozzle 12 is constant. It is contemplated, however, that the flow through pipe 13 need not be constant during all phases of operation. For example, if the ambient temperature is low and the fluid cooler need not operate, flow through pipe 13 could be precluded or delayed. It is enough that there be fluid flow through the Venturi nozzle 12 when it is desired that the fluid cooler operate. As stated above, depending on the temperature of the fluid, and thus its viscosity, flowing through the limiting device 12, a larger or smaller partial stream of the total quantity of fluid flowing through the tank pipe 5 will be drawn by the suction end of the limiting device 12 and fed to the fluid cooler 14.

During startup of the hydraulic system, when flow resistance in the pipes is high due to the low temperature of the fluid, virtually only the separate supply of fluid drawn from the fluid tank 6 by the constantly running fluid pump 17 will run through the fluid cooler 14. As the fluid temperature increases, reducing the flow resistance in the pipes, the limiting device 12 will draw an increasing amount of fluid from the tank pipe 5 into the separate circulating stream and to the fluid cooler 14. This self-regulating activity allows the fluid cooler 14 to function in its optimum range because an ideal quantity of fluid will always flow through the cooler without causing the maximum permissible pressure for the whole system to be exceeded.

While a preferred embodiment of the present invention has been illustrated and described, this has been by way of illustration and the invention should not be limited except as required by the scope of the appended claims.

I claim:

1. A self-propelled agricultural machine incorporating an internal combustion engine and a hydraulic drive system including a hydraulic pump which is driven by the internal combustion engine and draws hydraulic fluid from a fluid tank to produce a working stream of hydraulic fluid which is returned to the fluid tank, a cooler, and an apparatus for improving the efficiency of the cooler, comprising:

conduit means for providing a separate circulating stream of hydraulic fluid circulating separately from the working stream of hydraulic fluid and fed back to the fluid tank via the cooler; and a diverting device installed in the separate circulating stream of fluid upstream of the cooler, said diverting device operative for drawing a variable quantity of fluid away from the working stream of fluid into the separate circulating stream of fluid depending on the temperature of the separate circulating stream of fluid.

2. A self-propelled agricultural machine having an apparatus for improving the efficiency of the cooler as set forth in claim 1, wherein the diverting device is a Venturi nozzle having a suction inlet in communication with the working stream of hydraulic fluid.

3. A self-propelled agricultural machine having an apparatus for improving the efficiency of the cooler as set forth in claim 2, including a control valve for regulating the flow of fluid through the Venturi nozzle.

4. A method for improving the efficiency of a cooler in a hydraulic system of a self-propelled agricultural machine having an internal combustion engine which drives a hydraulic pump for drawing hydraulic fluid from a fluid tank and producing a working stream of hydraulic fluid which is returned to the fluid tank, the method comprising the steps of:

producing a separate circulating stream of hydraulic fluid that circulates separately from the working stream of hydraulic fluid and flows from the fluid tank through the cooler, and back to the fluid tank;

diverting a partial stream of hydraulic fluid from the working stream of hydraulic fluid to the cooler; and varying the flow of the diverted partial stream of hydraulic fluid depending on the temperature of the separate circulating stream of hydraulic fluid.

* * * * *